United States Patent Office 3,275,709
Patented Sept. 27, 1966

3,275,709
AIR-DRYING POLYESTER RESINS PREPARED FROM TETRAHYDROPHTHALIC ANHYDRIDE AND TRICARBOXYLIC ACIDS
George S. Wooster, Hamburg, and S. Edmund Berger, Tonawanda, N.Y., assignors to Allied Chemical Corporation, New York, N.Y., a corporation of New York
No Drawing. Filed Apr. 27, 1962, Ser. No. 190,788
4 Claims. (Cl. 260—861)

The present invention relates to new and improved coating compositions. More particularly, this invention relates to new polyester-vinyl copolymer coatings based on tetrahydrophthalic acid or anhydride which are air-drying at room or elevated temperatures. The new coatings are wax-free, mar and solvent resistant and possess excellent flexibility and impact strength.

Coatings based on polyester-vinyl copolymers are well-known and have received considerable attention due to their attractive appearance and outstanding physical and chemical properties. However, their usefulness as coating compositions is hindered by the fact that they are inhibited at the surface by oxygen in the atmosphere. Thus, if a coating of a standard polyester-vinyl composition is allowed to cure at room temperatures, this inhibiting effect of the oxygen will result in a soft, tacky, and soluble surface.

Various solutions for overcoming this oxygen-inhibiting problem have been suggested such as, for example, drying the coatings at a high temperature or adding to the polyester-vinyl systems substances such as paraffin waxes, which during the cure process reach the coating surface where they form a protective barrier against oxygen. However, drying at a high temperature is not practical for general use of a coating composition and the use of waxes leaves a film on the surface of the coating which must be removed by polishing or buffing. Even after the film has been removed, the coating surface often has an unattractive appearance.

Recent developments show that air-drying polyester-vinyl copolymerization products based on tetrahydrophthalic acid or anhydride dry rapidly to a tack-free state even at room temperatures because the polymerization-inhibiting action of oxygen does not occur. However, the usefulness of these compositions has heretofore been limited by the fact that coatings of such compositions are easily marked with a thumbnail and are sensitive to solvents.

To overcome an alleged "irritating effect" produced by a polyester-vinyl resin based on tetrahydrophthalic acid, it has been proposed to modify the resin by replacing a portion of the dihydric alcohol with a polyhydric alcohol, preferably glycerine. It was discovered that in addition to alleviating the alleged irritating effect, the presence of glycerine in the polyester-vinyl resin produced a coating having better drying properties and surface hardness. However, the prior art polyester-vinyl compositions based on tetrahydrophthalic acid and modified with glycerine, while possessing good mar resistance, tend to be somewhat brittle. Thus, these compositions are not particularly useful where the coatings are likely to be subjected to flexing.

It has now been discovered that the use of modifiers comprising tri-functional compounds having carboxylic acid or a mixture of carboxylic acid and alcoholic hydroxyl groups as their functional groups in air-drying tetrahydrophthalate polyester-vinyl copolymers produces hardness and mar resistance equal to or superior to that of the prior art and additionally provides improved flexibility and impact strength.

To prepare the new and improved unsaturated polyester resins, tetrahydrophthalic acid or anhydride is reacted with an alpha-beta unsaturated dicarboxylic acid or anhydride, a glycol and a modifier comprising a trifunctional compound as defined by this invention. It will be readily appreciated by one skilled in the art that endomethylene tetrahydrophthalic acid or anhydride may be used in place of tetrahydrophthalic acid or anhydride. Suitable alpha-beta dicarboxylic acids include, for example fumaric acid and maleic acid or anhydride. Glycols which have been found to be particularly useful in the present invention include ethylene glycol, diethylene glycol, triethylene glycol, tetraethylene glycol, higher polyethylene glycols having a molecular weight up to about 600 and mixtures thereof. Tri-functional compounds containing carboxylic acid functional groups or a mixture of alcoholic hydroxyl and carboxylic acid functional groups which have been found to be particularly useful as modifiers in the present invention include, for example, malic acid, trimellitic acid or anhydride and tris(2-carboxyethyl) isocyanurate.

The tetrahydrophthalic acid or anhydride, alpha-beta unsaturated dicarboxylic acid or anhydride, glycol and new tri-functional modifier are mixed together with an inhibitor, such as hydroquinone (about 0.015 percent by weight of the expected, theoretical yield of polyester) and a vehicle such as xylene (sufficient to maintain reflux). This mixture is then charged to a reaction vessel where it is subjected to azeotropic refluxing under a blanket of inert gas such as nitrogen at a temperature within the range of 180°-200° C. This esterification reaction is continued until an acid number of from 30 to 36 is reached. The xylene is then distilled off from the esterification mixture after which said mixture is cooled to 100°-110° C. in preparation for mixing with a vinyl monomer which has at least one $CH_2=C<$ group.

The proportions of reactants used to produce the new polyesters are such that a slight excess of hydroxyl groups to carboxyl groups exists. For example, from about 102 to 110 equivalents, preferably about 105, of alcohol to 100 equivalents of acid and/or anhydride are employed (ratio of OH groups to COOH groups is from about 1.02 to 1.1, preferably about 1.05). The proportion of tetrahydrophthalic acid or anhydride should amount to from about 40 to 55 equivalents, preferably about 45 equivalents, per 100 equivalents of total carboxy groups present.

The following examples are illustrative of the methods by which the new polyesters of this invention are prepared. It is not intended that the scope of the invention be limited to these specific examples.

Example 1

A polyester was prepared by heating a mixture of 1 mol tetrahydrophthalic acid, 1 mol fumaric acid, 2.24 mols diethylene glycol and 0.254 mol malic acid in the presence of an amount of hydroquinone equal to 0.015 percent by weight of expected, theoretical yield of polyester under azeotropic reflux conditions at 190°-195° C. Xylene, in an amount sufficient to maintain reflux, was used as a vehicle. The esterification reaction was carried out to an acid number of 34.8. The xylene was then distilled off from the esterification mixture by heating for half an hour at 150°-160° C. under a pressure of 15–20 mm. Hg. The polyester was then cooled in preparation for mixing with a vinyl monomer.

*Example 2*

A polyester was prepared from 1 mol tetrahydrophthalic anhydride, 1 mol fumaric acid, 2.36 mols diethylene glycol and 0.167 mol trimellitic anhydride in the presence of hydroquinone by the method of Example 1 above. The esterification reaction was stopped when the polyester attained an acid number of 35.4.

*Example 3*

A polyester was prepared from 1 mol tetrahydrophthalic anhydride, 1 mol fumaric acid, 2.36 mols diethylene glycol and 0.167 mol tris(2-carboxyethyl)isocyanurate in the presence of hydroquinone by the method of Example 1 above. The esterification reaction was continued until the polyester reached an acid number of 32.0.

*Example 4*

For comparison purposes, a control polyester was prepared from 1 mol tetrahydrophthalic anhydride, 1 mol fumaric acid, 1.785 mols diethylene glycol, and 0.206 mol glycerine under the same reaction conditions as employed in Example 1. The resulting polyester had an acid number of 30.6.

Preparation of the polyesters produced in accordance with this invention for use as coating compositions is accomplished by mixing the polyesters which have been cooled to a temperature of from 100°–110° C. with 40–60 percent by weight of the total composition of a suitable vinyl monomer having at least one $CH_2=C<$ group, preferably styrene. Immediately before use, a suitable catalyst system is added to the mixture. Such catalyst systems include the well-known peroxides used in the presence of a conventional metallic salt promoter. Useful peroxide catalysts include, for example, benzoyl peroxide, acetyl peroxide, tetralin hydroperoxide, 1-hydroxy-cyclohexyl-hydroperoxide-1, tertiary-butyl hydroperoxide, and methylethyl ketone hydroperoxide. Useful metallic salt promoters include, for example, the naphthenates, resinates, linoleates, and other soluble salts of metals selected from the class consisting of cobalt, manganese, copper, iron, chromium, calcium, nickel, lead, vanadium, and others. The catalyst-promoter initiates copolymerization of the polyester and the vinyl monomer thus effecting final cure of the polyester-vinyl resin.

To test the properties of air-dried coatings prepared from the polyesters produced by Examples 1–4, the polyesters were cooled to 100°–110° C. and an equal weight of styrene mixed in. The polyester-styrene mixture was rapidly cooled to 25° C. Shortly before use the polyester-styrene coating composition was charged with a catalyst-promoter system comprising 1.5 percent of methylethyl ketone peroxide and 0.021 percent by weight of cobalt as cobalt naphthenate based on the weight of the polyester-styrene resin to promote curing. Despite the fact that no flow agent was used in these tests, satisfactory coatings were obtained on unprimed surfaces by either pour-down or draw-down.

To test the hardness of the new resins, coatings of a polyester-styrene resin containing the various polyesters of Examples 1–4 were applied to a glass substrate. A wet film thickness of 3 mils was used. A Sward Rocker Hardness test was used as described by H. A. Gardner in "Examination of Paints, Varnishes, Lacquers, Colors," Sixth Edition, page 206. The Sward Rocker Hardness values were determined after one, three, and seven days with the following results:

| Polyester | 1 Day | 3 Days | 7 Days |
|---|---|---|---|
| Example 1 | 14 | 18 | 24 |
| Example 2 | 16 | 18 | 22 |
| Example 3 | 16 | 20 | 30 |
| Example 4 | 16 | 20 | 24 |

The mar resistance of the resins was determined on two substrates, birchwood and Masonite panels. Coatings of a polyester-styrene resin prepared from each of the polyesters of Examples 1–4 were applied to each type of panel. The mar resistance was given an arbitrary numerical value based on the "thumb nail scratch test." This test consists of scratching the dried polyester-styrene resin coating with the thumb nail until a permanent "mar" or scratch is produced. The following scale was used.

0—no visible mar or scratches when maximum pressure is applied
1—very difficult to mar, very slight scratches produced by maximum pressure
2—will mar with maximum pressure, positive scratch marks
3—mars very easily with little pressure.

The various coatings were tested after one, three, seven, and thirty days with the following results:

MAR RESISTANCE

| Polyester | One Day | | Three Days | | Seven Days | | Thirty Days | |
|---|---|---|---|---|---|---|---|---|
| | Birch | Masonite | Birch | Masonite | Birch | Masonite | Birch | Masonite |
| Example 1 | 2 | 2 | 1–2 | 1–2 | 1–2 | 1 | 0 | 0 |
| Example 2 | 2 | 2 | 1–2 | 1–2 | 1–2 | 2 | 0 | 0 |
| Example 3 | 2 | 2 | 1–2 | 1–2 | 1–2 | 2 | 0 | 0 |
| Example 4 | 2 | 2 | 1–2 | 1–2 | 1 | 1–2 | 0 | 0 |

In all cases mar resistance gradually improved with time. The rate at which this occurred is substantially identical in all cases. It has also been observed that excellent mar resistance can be achieved by post-curing the panels one-half to two hours at 50° C.

Finally the various new resins were tested for flexibility and impact strength on unprimed steel standard panels and unprimed aluminum standard panels. Polyester-styrene resin coatings of each of the polyesters in Examples 1–4 were applied to both the steel and the aluminum panels. The coatings, having a thickness of 1 mil when dry, were cured at room temperature for 24 hours and then baked at 50° C. for 20 hours before testing for flexibility and impact strength. Flexibility was tested by employing an ⅛" conical mandrel in the manner described in H. A. Gardner's "Examination of Paints, Varnishes, Lacquers, Colors." Impact strength was determined by using a modified Gardner Impactor (60" sleeve) in the manner described in the above-mentioned publication by H. A. Gardner. (Note the section of impact tests.) The following results were obtained:

FLEXIBILITY AND IMPACT STRENGTH

| Polyester | Steel Panel | | | | | Aluminum Panel | | | | |
|---|---|---|---|---|---|---|---|---|---|---|
| | Flex ⅛ inch Mandrel | Impact Strength (Inch-pounds) | | | | Flex ⅛ inch Mandrel | Impact Strength (Inch-pounds) | | | |
| | | Direct | | Reverse | | | Direct | | Reverse | |
| | | Pass | Fail | Pass | Fail | | Pass | Fail | Pass | Fail |
| Example 1 | Pass | 60 | 60+ | 56 | 60 | Pass | 32 | 34 | 20 | 22 |
| Example 2 | do | 60 | 60+ | 60 | 64+ | do | 24 | 28 | 10 | 12 |
| Example 3 | do | 50 | 54 | 40 | 44 | Fail | 20 | 24 | 14 | 18 |
| Example 4 | do | 56 | 60 | 34 | 40 | do | 20 | 24 | 10 | 12 |

From the results of the foregoing tests, it is readily apparent that the new polyesters of this invention provide polyester-vinyl coatings which air-dry quickly at room or higher temperatures and which have a hardness, mar resistance, flexibility, and impact strength which are equal or superior to any heretofore known. In addition, coatings of the new compositions are clear, have a high gloss, and exhibit good resistance to solvents.

The illustrative examples provided hereinabove serve merely to typify the invention and are not to be considered as limitations thereof. Other modifications and variations will occur to those skilled in the art and are within the spirit and scope of the invention as defined by the appended claims.

We claim:

1. A polymerizable, unsaturated polyester which comprises the esterification product of: (a) a compound selected from the group consisting of tetrahydrophthalic acid, endomethylene tetrahydrophthalic acid and the anhydrides thereof; (b) an alpha-beta unsaturated dicarboxylic acid; (c) a glycol selected from the group consisting of ethylene glycol, diethylene glycol, triethylene glycol, tetraethylene glycol, and higher polyethylene glycols having a molecular weight less than about 600; and (d) a minor amount of malic acid.

2. A polymerizable unsaturated polyester which comprises the esterification product of: (a) a compound selected from the group consisting of tetrahydrophthalic acid, endomethylene tetrahydrophthalic acid and the anhydrides thereof; (b) an alpha-beta unsaturated dicarboxylic acid; (c) a glycol selected from the group consisting of ethylene glycol, diethylene glycol, triethylene glycol, tetraethylene glycol, and higher poyethylene glycols having a molecular weight less than about 600; and (d) a minor amount of tris (2-carboxyethyl)isocyanurate.

3. A polymerizable unsaturated polyester which comprises the esterification product of: (a) tetrahydrophthalic acid anhydride; (b) fumaric acid; (c) diethylene glycol, and; (d) malic acid, said tetrahydrophthalic acid anhydride providing from about 40 to about 55 equivalents per 100 equivalents of the carboxylic groups present, said malic acid providing about 10 equivalents per 100 equivalents of the carboxylic groups present.

4. A polymerizable unsaturated polyester which comprises the esterification product of: (a) tetrahydrophthalic acid anhydride; (b) fumaric acid; (c) diethylene glycol, and; (d) tris (2-carboxyethyl)isocyanurate, said tetrahydrophthalic acid anhydride providing from about 40 to about 55 equivalents per 100 equivalents of the carboxylic groups present, said tris (2-carboxyethyl)isocyanurate providing about 10 equivalents per 100 equivalents of the carboxylic groups present.

References Cited by the Examiner

UNITED STATES PATENTS

| 3,042,656 | 7/1962 | Frey | 260—861 |
| 3,044,978 | 7/1962 | Hagele et al. | 260—861 |
| 3,067,179 | 12/1962 | Frey | 260—861 |

FOREIGN PATENTS

| 830,794 | 3/1960 | Great Britain. |
| 842,958 | 8/1960 | Great Britain. |

MURRAY TILLMAN, *Primary Examiner.*

WILLIAM H. SHORT, J. W. SANNER, J. T. GOOLKASIAN, *Assistant Examiners.*